(No Model.)
J. W. CALEF.
DRAG SAW MACHINE.
No. 470,779. Patented Mar. 15, 1892.
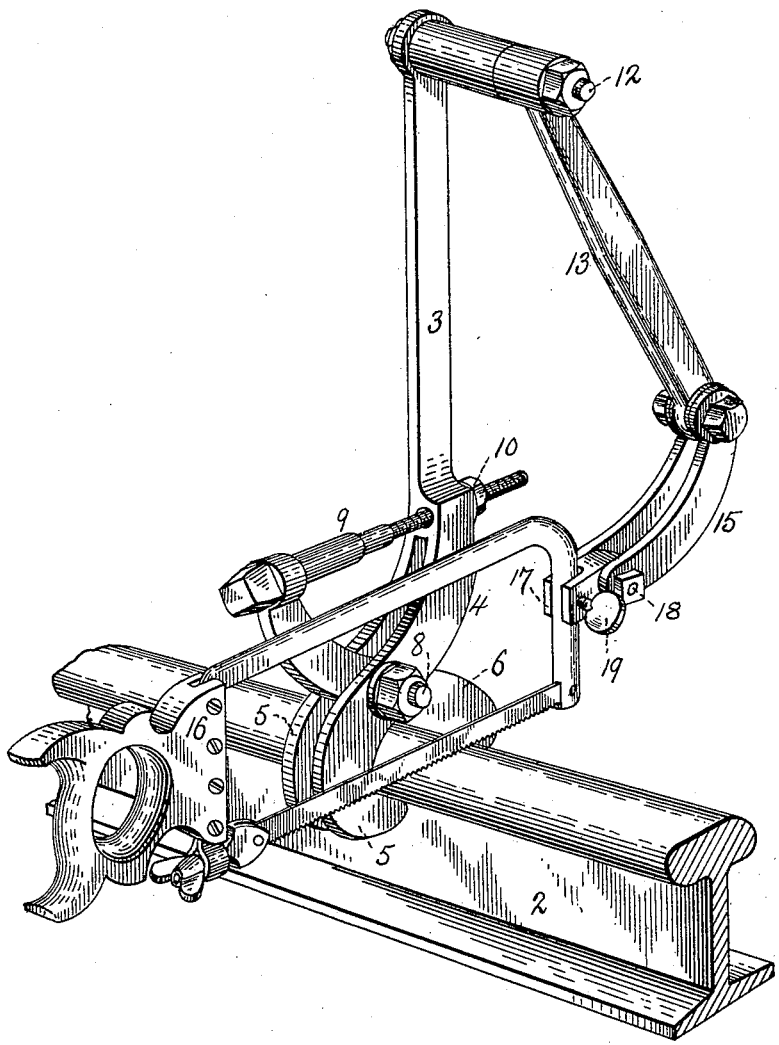
Witnesses.
Henry Marsh.
Richard W. Lodge
Inventor.
Joseph W. Calef.
by H. E. Lodge Atty.

United States Patent Office.

JOSEPH W. CALEF, OF EASTON, MASSACHUSETTS, ASSIGNOR OF ONE-HALF TO EDWARD R. HAYWARD, OF SAME PLACE.

DRAG-SAW MACHINE.

SPECIFICATION forming part of Letters Patent No. 470,779, dated March 15, 1892.

Application filed April 4, 1891. Renewed February 9, 1892. Serial No. 420,915. (No model.)

*To all whom it may concern:*

Be it known that I, JOSEPH W. CALEF, a citizen of the United States, residing at Easton, in the county of Bristol and State of Massachusetts, have invented certain new and useful Improvements in Drag-Saw Machines; and I do hereby declare the following to be a full, clear, and exact description of the invention, such as will enable others skilled in the art to which it appertains to make and use the same, reference being had to the accompanying drawing, and to figures of reference marked thereon, which form a part of this specification.

This invention relates to drag-saw machines, particularly such as are designed for cutting steel rails in railway-track work.

The object of my invention is to provide a standard or support adapted to be readily attached to or removed from a rail, so that the latter can be operated upon with equal facility whether it is set in place and forms part of a continuous-rail system or as a single loose rail to be cut of a requisite length.

The drawing herewith presented represents a perspective view of a rail in part, with a drag-saw machine containing my invention secured thereto in readiness for operation.

In the accompanying drawing, 2 represents a rail adapted for steam-railway service and which is to be cut of a desired length. To accomplish this and carry out my invention, a standard or support 3 is removably mounted upon the rail near the point where the cut is to be made. This standard is preferably an upright post of any desired shape and of such cross-section as to give the requisite strength and stiffness during the act of sawing. The lower portion or foot 4 is bifurcated and terminates in two hooks 55, shaped to conform somewhat to the head of the rail. These hooks grasp the rail upon one side, while a similarly-hooked lever 6, oppositely disposed and pivotally hung at 8 between the hooks 55, serves to grip the rail upon the other side. The tail of this lever extends upwardly and is connected to the standard by a screw-threaded rod 9 with an adjusting-nut 10 or other device, by which the lever can be made to co-operate with the foot of the standard, and thus hold the latter firmly upon the rail.

Transversely of the standard and at its upper end is mounted a short shaft or rod 12, which is in parallelism with the rail, or approximately so, and projects from the side upon which the saw is to be hung. Pendent from the end of said shaft 12 is a rocker-arm 13, which may be a single piece, as shown in the drawings, or duplicated to form a frame, and thus afford greater rigidity, while a link 15 is to be pivotally mounted at the end of said arm.

The saw is shown at 16 as hung upon the standard by means of a block 17. The latter is attached by the pin 18 to the link, while the holding-screw 19 serves to connect the saw at its front end detachably to the block.

By the arrangement of the above parts as detailed the saw is allowed to swing freely in right lines and is kept in contact with the rail at all times during its reciprocations. Moreover, as the saw feeds down the link and arm move to correspond with the depth of the cut, and at the same time the direction of said cut can be controlled by the position of the standard upon the rail. Thus if the cut is to be exactly at right angles to the length of the rail the shaft 12 should be adjusted parallel with the rail.

A further advantage in this device will be seen from the fact that a rail can be cut when it is spiked in position and without its removal. This is particularly to be desired at times. The standard can be attached to the rail at any point and very readily removed. In case of a loose rail the standard is to be secured to the head of the rail, as shown, while the weight of the rail holds the device steady, and the cutting can be performed with ease and celerity.

It is obvious that with my apparatus a very small piece of rail can be cut off, which was a difficult matter under the old system of using the cold-chisel and then removing the length so marked by a series of heavy blows.

What I claim is—

1. An upright standard or support adapted to be removably secured to a rail, combined with a rocker-arm and link mounted laterally of said standard at its top, and a drag-saw pivotally hung to said link to move in right lines, substantially as set forth.

2. In combination with the standard, its hooked foot, and the co-operating hooked lever to grasp the rail-head, a rocker-arm, the pendent link, a pivotal block in said link at one end, and a saw adapted to be removably united at its front end to the block, substantially as explained.

3. The combination, with the standard 2, its foot 4, the hooked lever 6, pivotally secured, the operating-rod 9, and the lateral shaft 12, of the rocker-arm pendent from said shaft, the link 15, pivotally mounted at the end of said rocker-arm, and the block 17, which unites the saw with the link, substantially as described and stated.

In testimony whereof I affix my signature in presence of two witnesses.

JOSEPH W. CALEF.

Witnesses:
H. E. LODGE,
EDWARD R. HAYWARD.